US012269159B2

(12) United States Patent
Obana

(10) Patent No.: US 12,269,159 B2
(45) Date of Patent: Apr. 8, 2025

(54) ROTATION DEVICE

(71) Applicant: Sony Interactive Entertainment Inc., Tokyo (JP)

(72) Inventor: Koichi Obana, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 186 days.

(21) Appl. No.: 17/579,001

(22) Filed: Jan. 19, 2022

(65) Prior Publication Data

US 2022/0268397 A1     Aug. 25, 2022

(30) Foreign Application Priority Data

Feb. 24, 2021   (JP) .................................. 2021-027549

(51) Int. Cl.
  *B25J 17/02*     (2006.01)
  *B25J 9/10*      (2006.01)
  *B25J 5/00*      (2006.01)

(52) U.S. Cl.
  CPC ........... *B25J 17/0283* (2013.01); *B25J 9/102* (2013.01); *B25J 17/0258* (2013.01); *B25J 5/007* (2013.01)

(58) Field of Classification Search
  CPC .... B25J 9/102; B25J 17/0258; B25J 17/0283; B25J 5/007
  USPC .......................... 901/25; 74/490.05; 248/487
  See application file for complete search history.

(56) References Cited

U.S. PATENT DOCUMENTS

| | | | | | |
|---|---|---|---|---|---|
| 3,543,593 | A | * | 12/1970 | Jelatis | B25J 3/00 |
| | | | | | 901/29 |
| 3,922,930 | A | * | 12/1975 | Fletcher | F16H 1/006 |
| | | | | | 901/29 |
| 4,068,536 | A | * | 1/1978 | Stackhouse | B25J 9/045 |
| | | | | | 901/29 |
| 4,068,763 | A | * | 1/1978 | Fletcher | B25J 9/0087 |
| | | | | | 901/29 |

(Continued)

FOREIGN PATENT DOCUMENTS

| | | |
|---|---|---|
| CN | 102729258 A | 10/2012 |
| CN | 104875214 A | 9/2015 |

(Continued)

OTHER PUBLICATIONS

Notice of Reasons for Refusal for correspodning JP Application No. 2021-027549, 8 pages, dated Jul. 19, 2024.

*Primary Examiner* — Taylor Morris
(74) *Attorney, Agent, or Firm* — Kilpatrick Townsend & Stockton LLP

(57) ABSTRACT

A rotation device includes a two-axis rotation mechanism including a first bevel gear, a second bevel gear disposed at a position where the second bevel gear coaxially faces the first bevel gear in an axial direction, a third bevel gear that meshes with the first bevel gear and the second bevel gear, a first motor for supplying rotational force to the first bevel gear, and a second motor for supplying rotational force to the second bevel gear; a one-axis rotation mechanism including a drive shaft and a third motor for supplying rotational force to the drive shaft; and an attachment member that attaches the two-axis rotation mechanism to the one-axis rotation mechanism such that a rotational axis of the drive shaft passes a point of intersection where a rotational axis of the first bevel gear and the second gear and that of the third bevel gear intersect with each other.

4 Claims, 13 Drawing Sheets

(56) References Cited

U.S. PATENT DOCUMENTS

| | | | | |
|---|---|---|---|---|
| 4,489,624 A * | 12/1984 | Schaib | B25J 19/0029 901/22 |
| 4,499,790 A * | 2/1985 | Helms | B25J 17/0258 901/29 |
| 4,507,046 A * | 3/1985 | Sugimoto | B25J 9/046 901/29 |
| 4,515,039 A * | 5/1985 | Nord | B25J 9/102 901/29 |
| 4,573,727 A * | 3/1986 | Iikura | B25J 17/0258 901/31 |
| 4,606,695 A * | 8/1986 | Lenz | B25J 9/046 901/29 |
| 4,608,884 A * | 9/1986 | Beyer | B25J 17/0258 901/29 |
| 4,624,621 A * | 11/1986 | Murakami | B25J 17/0258 901/29 |
| 4,627,786 A * | 12/1986 | Minematsu | B25J 9/102 901/29 |
| 4,784,422 A * | 11/1988 | Jones | B25J 15/0206 414/753.1 |
| 4,846,015 A * | 7/1989 | Keppler | B25J 9/102 901/29 |
| 4,900,997 A * | 2/1990 | Durand | B25J 9/126 74/665 M |
| 4,922,782 A * | 5/1990 | Kawai | B25J 9/0084 310/71 |
| 5,428,713 A * | 6/1995 | Matsumaru | B25J 9/1615 700/262 |
| 5,456,132 A * | 10/1995 | Iwanaga | B25J 17/0283 901/29 |
| 5,497,674 A * | 3/1996 | Inada | B25J 9/046 901/29 |
| 5,609,216 A * | 3/1997 | Fisher | B62D 7/026 180/24.03 |
| 6,093,078 A * | 7/2000 | Cook | A63H 7/06 446/338 |
| 6,658,962 B1 * | 12/2003 | Rosheim | B25J 17/0275 901/26 |
| 7,454,995 B2 * | 11/2008 | Koyama | B25J 9/102 901/23 |
| 7,806,020 B2 * | 10/2010 | Forslund | B25J 19/0029 901/29 |
| 8,347,753 B2 * | 1/2013 | Larsson | B25J 19/0029 901/29 |
| 8,380,351 B2 * | 2/2013 | Okuda | F16H 1/16 700/275 |
| 8,607,659 B2 * | 12/2013 | Zhang | B25J 9/102 901/19 |
| 8,616,088 B2 * | 12/2013 | Teng | B25J 9/102 74/665 M |
| 8,894,117 B1 * | 11/2014 | Cheon | B25J 15/0009 901/38 |
| 9,140,344 B2 * | 9/2015 | Teng | B25J 9/102 |
| 9,321,179 B2 * | 4/2016 | Inoue | F16H 1/145 |
| 9,327,785 B2 * | 5/2016 | Alfayad | B62D 57/032 |
| 9,597,605 B1 * | 3/2017 | Chung | A63H 31/00 |
| 9,743,987 B2 * | 8/2017 | Farritor | A61B 34/30 |
| 10,414,044 B2 * | 9/2019 | Motomura | B25J 9/0009 |
| 10,465,768 B2 * | 11/2019 | Nakayama | B25J 9/102 |
| 10,759,047 B1 * | 9/2020 | Hamada | F16H 1/36 |
| 11,613,028 B2 * | 3/2023 | Fukamachi | F16H 3/145 74/89.13 |
| 2006/0011010 A1 * | 1/2006 | Koyama | B25J 9/102 74/490.05 |
| 2011/0232410 A1 * | 9/2011 | Long | B25J 17/0258 74/490.01 |
| 2011/0314950 A1 * | 12/2011 | Mamba | B25J 19/0029 901/26 |
| 2014/0213409 A1 * | 7/2014 | Yoon | B25J 9/1025 74/423 |
| 2015/0258680 A1 * | 9/2015 | Koessler | B25J 9/102 74/661 |
| 2016/0135898 A1 * | 5/2016 | Frederick | B25J 9/102 606/29 |
| 2017/0259436 A1 * | 9/2017 | Nakayama | B25J 19/0029 |
| 2018/0304457 A1 * | 10/2018 | Hutson | B25J 9/06 |
| 2019/0207468 A1 * | 7/2019 | Chen | H02K 7/116 |
| 2019/0216552 A1 * | 7/2019 | Palmowski | B25J 9/102 |
| 2019/0314979 A1 * | 10/2019 | Zuo | B25J 9/1025 |
| 2020/0206912 A1 * | 7/2020 | Wu | B25J 9/0024 |
| 2020/0276720 A1 * | 9/2020 | Cui | B25J 17/0258 |
| 2020/0290197 A1 * | 9/2020 | Inoue | B25J 9/0009 |
| 2021/0078165 A1 * | 3/2021 | Tang | B25J 9/065 |
| 2022/0097226 A1 * | 3/2022 | Kwon | B25J 18/007 |
| 2023/0356417 A1 * | 11/2023 | Kim | B25J 9/1674 |

FOREIGN PATENT DOCUMENTS

| | | | | |
|---|---|---|---|---|
| CN | 106808469 A | * | 6/2017 | B25J 9/102 |
| CN | 109591047 A | * | 4/2019 | B25J 17/0283 |
| CN | 109866250 A | * | 6/2019 | B25J 17/0258 |
| JP | 01150042 A | | 6/1989 | |
| JP | 200569342 A | | 3/2005 | |
| JP | 2012118145 A | | 6/2012 | |
| JP | 2017216643 A | | 12/2017 | |
| JP | 2022129024 A | * | 9/2022 | |
| KR | 20130030473 A | * | 3/2013 | B25J 17/0241 |
| WO | WO-2018214217 A1 | * | 11/2018 | B25J 5/007 |

* cited by examiner

30

30

ROTATION DEVICE

CROSS REFERENCE TO RELATED APPLICATION

This application claims the benefit of Japanese Priority Patent Application JP 2021-027549 filed Feb. 24, 2021, the entire contents of which are incorporated herein by reference.

BACKGROUND

The present disclosure relates to a rotation device that provides rotation around a plurality of axes.

In recent years, a technology called teleexistence that uses a robot disposed at a distant place as one's own alter ego has been developed. When a robot at a distant place transmits surrounding image data and sound data to a user such that they are reproduced at the user side, the user can communicate with persons around the robot with such a sense of presence that the user himself/herself is present at the place where the robot is disposed.

Japanese Patent Laid-open No. 2017-216643 discloses an actuator device for a robot that is controlled remotely. The actuator device includes a first arcuate arm having a first elongated through-hole formed therein, a second arcuate arm having a second elongated through-hole formed therein, a pedestal that supports the first arcuate arm and the second arcuate arm for pivotal motion in a state in which they intersect with each other, a first motor that rotates the first arcuate arm, a second motor that rotates the second arcuate arm, and an insertion member inserted in the first elongated through-hole and the second elongated through-hole. A housing in which a camera is accommodated is attached to the insertion member.

SUMMARY

The actuator device disclosed in Japanese Patent Laid-open No. 2017-216643 may not be structurally reduced in size because it uses the first arcuate arm and the second arcuate arm.

Thus, it is desirable to provide a compact rotation device that provides rotation around a plurality of axes.

According to a mode of the present disclosure, there is provided a rotation device including a two-axis rotation mechanism, a one-axis rotation mechanism, and an attachment member. The two-axis rotation mechanism includes a first bevel gear, a second bevel gear disposed at a position where the second bevel gear coaxially faces the first bevel gear in an axial direction, a third bevel gear that meshes with the first bevel gear and the second bevel gear, a first motor for supplying rotational force to the first bevel gear, and a second motor for supplying rotational force to the second bevel gear, a rotational axis of the first bevel gear and the second bevel gear and a rotational axis of the third bevel gear intersecting with each other at a point of intersection. The one-axis rotation mechanism includes a drive shaft and a third motor for supplying rotational force to the drive shaft. The attachment member attaches the two-axis rotation mechanism to the one-axis rotation mechanism such that a rotational axis of the drive shaft passes the point of intersection.

DETAILED DESCRIPTION OF THE PREFERRED EMBODIMENT

Figure 1:
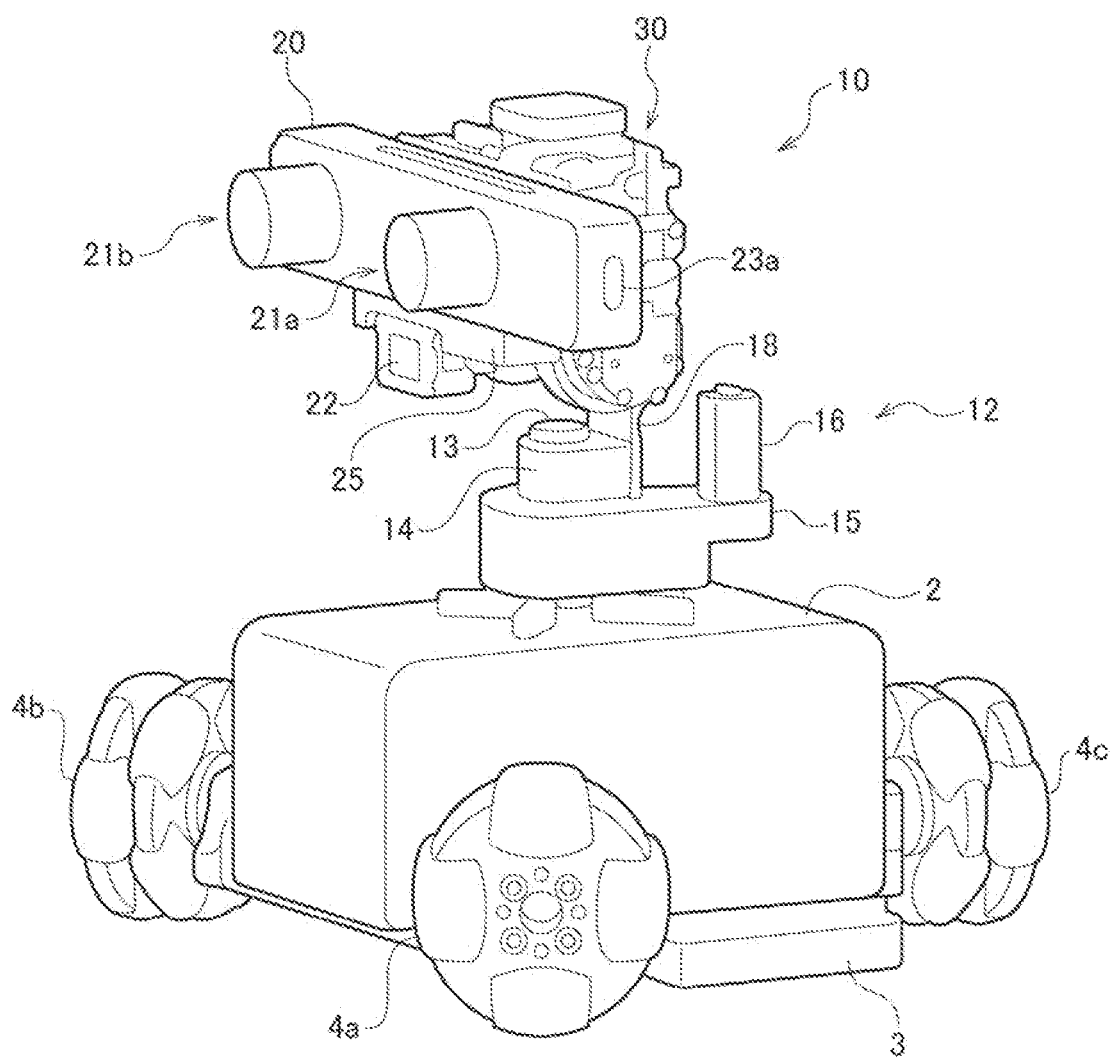
FIG. 1 is a perspective view of a robot apparatus in which a rotation device is incorporated.
Figure 2:
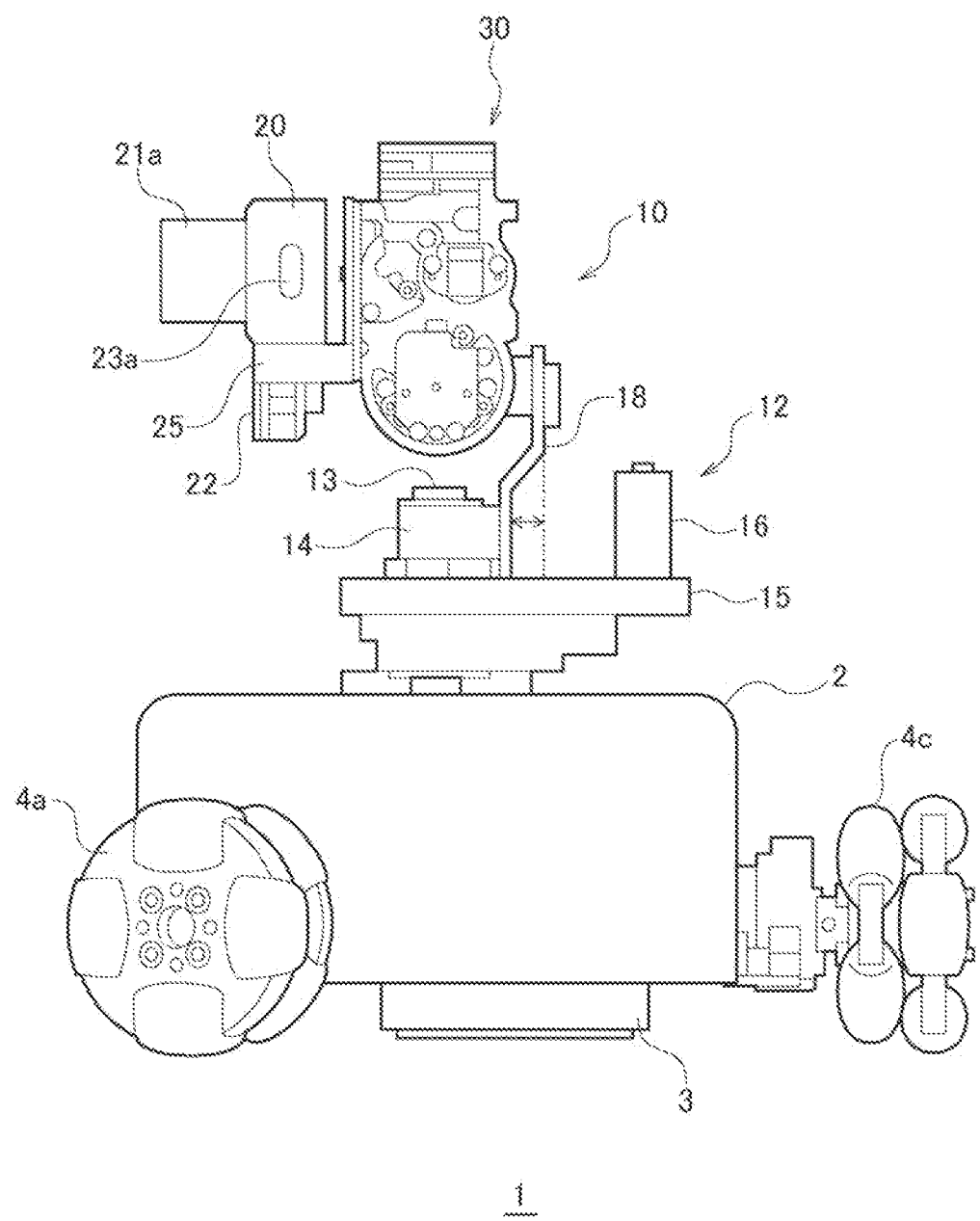
FIG. 2 is a side elevational view of the robot apparatus in which the rotation device is incorporated.

FIG. 1 depicts a perspective view of a robot apparatus in which a rotation device of an embodiment is incorporated, and FIG. 2 depicts a side elevational view of the robot apparatus in which the rotation device of the embodiment is incorporated. The robot apparatus 1 includes a base 2 in which a control device and so forth are accommodated, a plurality of driving wheels 4a, 4b, and 4c (in the following description, in a case where they need not be distinguished from each other, each of them is referred to as a "driving wheel 4") attached to side faces of the base 2, a battery 3 attached to a lower face of the base 2, and a rotation device 10 mounted on an upper face of the base 2. The driving wheel 4 may be an omni wheel, and the three driving wheels 4 may implement movement of the robot apparatus in all directions. The battery 3 supplies electric power to a plurality of electric parts incorporated in the robot apparatus 1.

The rotation device 10 of the embodiment includes a one-axis rotation mechanism 12 and a two-axis rotation mechanism 30 to implement 3-axis rotational motion. In the rotation device 10, one rotational axis of the one-axis rotation mechanism 12 and two rotational axes of the two-axis rotation mechanism 30 normally intersect with each other at one point. Accordingly, the rotation device 10 implements three-axis rotational motion having a common center point.

In the robot apparatus 1, a housing 20 in which cameras and microphones are accommodated is fixed to the two-axis rotation mechanism 30 through a fixation member 25. On a front face of the housing 20, a left camera 21a and a right camera 21b are disposed in a predetermined spaced relation with each other in the lateral direction. The left camera 21a and the right camera 21b configure a stereo camera. A left microphone 23a and a right microphone (not depicted) are disposed on the opposite side faces of the housing 20. A speaker 22 that outputs sound is provided in the middle of the fixation member 25. The housing 20 and the fixation member 25 may configure the head of the robot apparatus 1.

For example, in a case where the robot apparatus 1 is used in a teleexistence environment, the rotation device 10 can reproduce a movement of the head of the user present at a distant place by implementing the three-axis rotational motion having the common center of rotation.

While, in Japan, a vertical shake of the head represents an affirmative and a horizontal shake of the head represents a negative, since the rotation device 10 can perform three-axis rotational motion, the housing 20 can be moved in a manner similar to that of the head of the user present at a distant place. Thus, a person around the robot apparatus 1 can sense the intention of the user present at a distant place from the movement of the housing 20. The movement of the head of the user being reproducible with a simple, easy, and compact structure in such a manner is useful in the teleexistence technology.

In the rotation device 10, the one-axis rotation mechanism 12 is in charge of rotational motion around a yaw axis and includes a drive shaft 13, a connection portion 14, a speed reduction mechanism housing unit 15, and a motor 16. The motor 16 supplies rotational force to the drive shaft 13. The speed reduction mechanism housing unit 15 accommodates therein a speed reduction mechanism that transmits rotational force of the motor 16 to the drive shaft 13. The speed reduction mechanism may include a combination of a plurality of plain gears. The connection portion 14 is fixed to the drive shaft 13, and fixed to the connection portion 14 is a lower end of an attachment member 18 that attaches the two-axis rotation mechanism 30 to the one-axis rotation mechanism 12.

In the rotation device 10, the two-axis rotation mechanism 30 is in charge of rotational motion around the pitch axis and rotational motion around the roll axis. FIGS. 3 to 6 depict an internal structure of the two-axis rotation mechanism 30 with the case body removed, and details of the structure of the two-axis rotation mechanism 30 are described below with reference to FIGS. 3 to 6.

Figure 3:
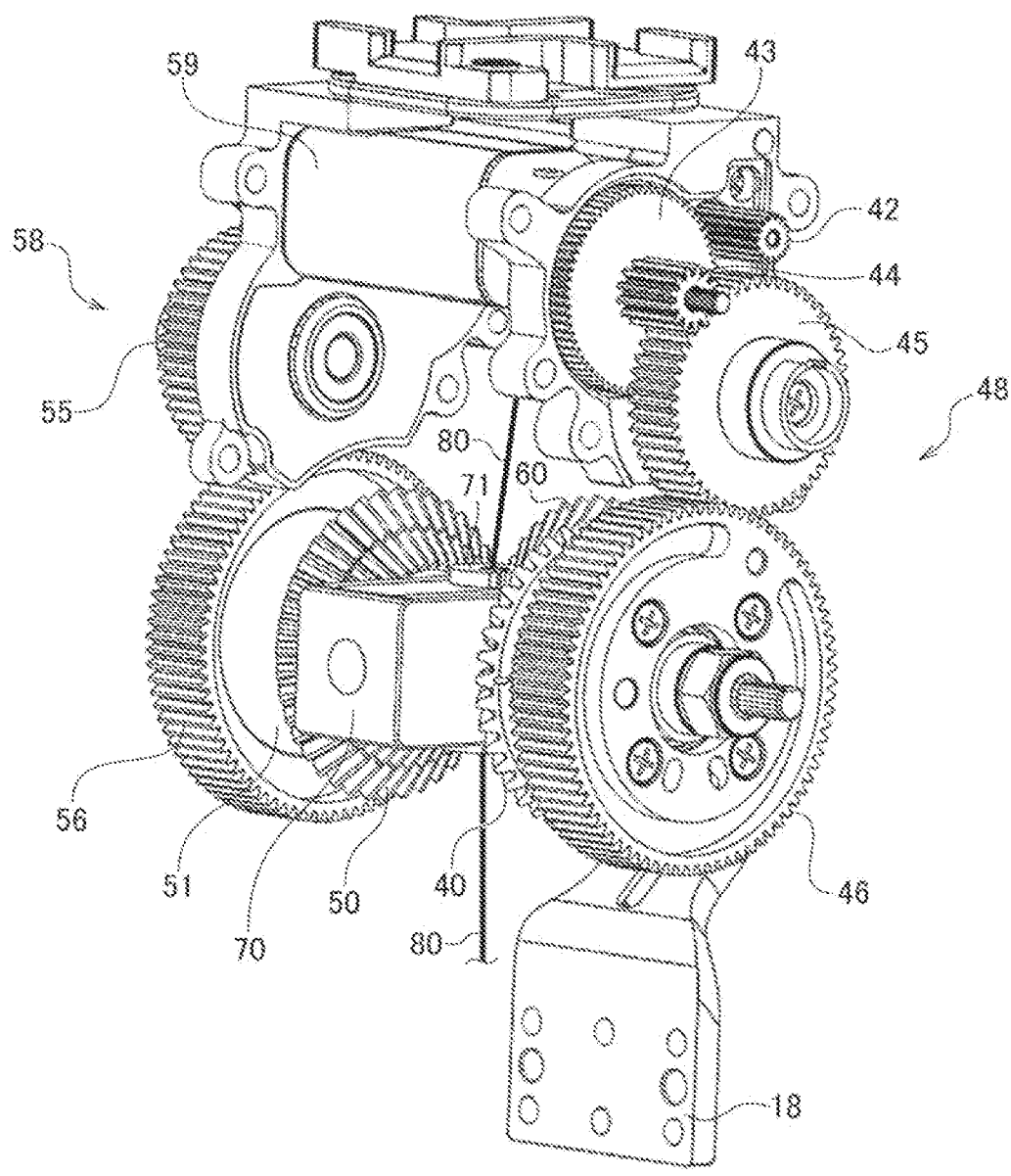
FIG. 3 is a left front perspective view of a two-axis rotation mechanism.
Figure 4:
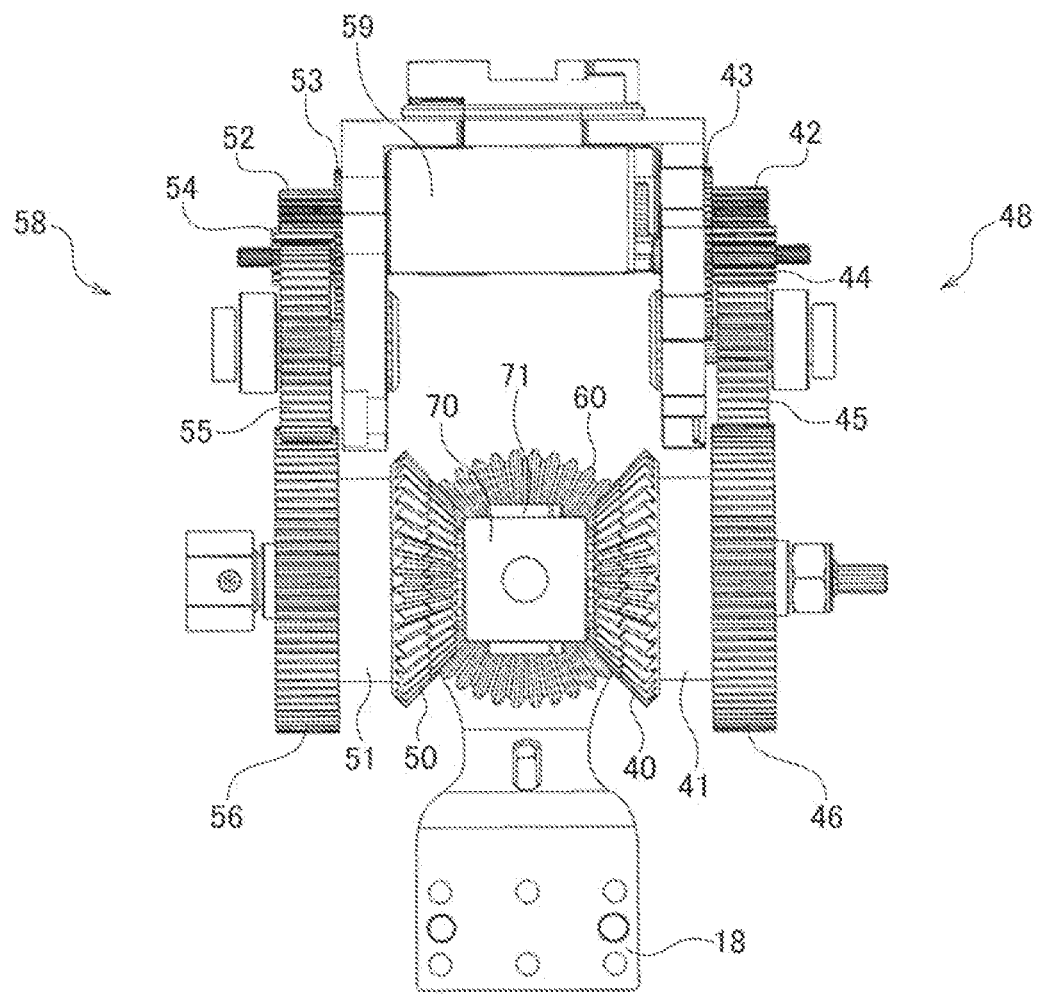
FIG. 4 is a front elevational view of the two-axis rotation mechanism.
Figure 5:
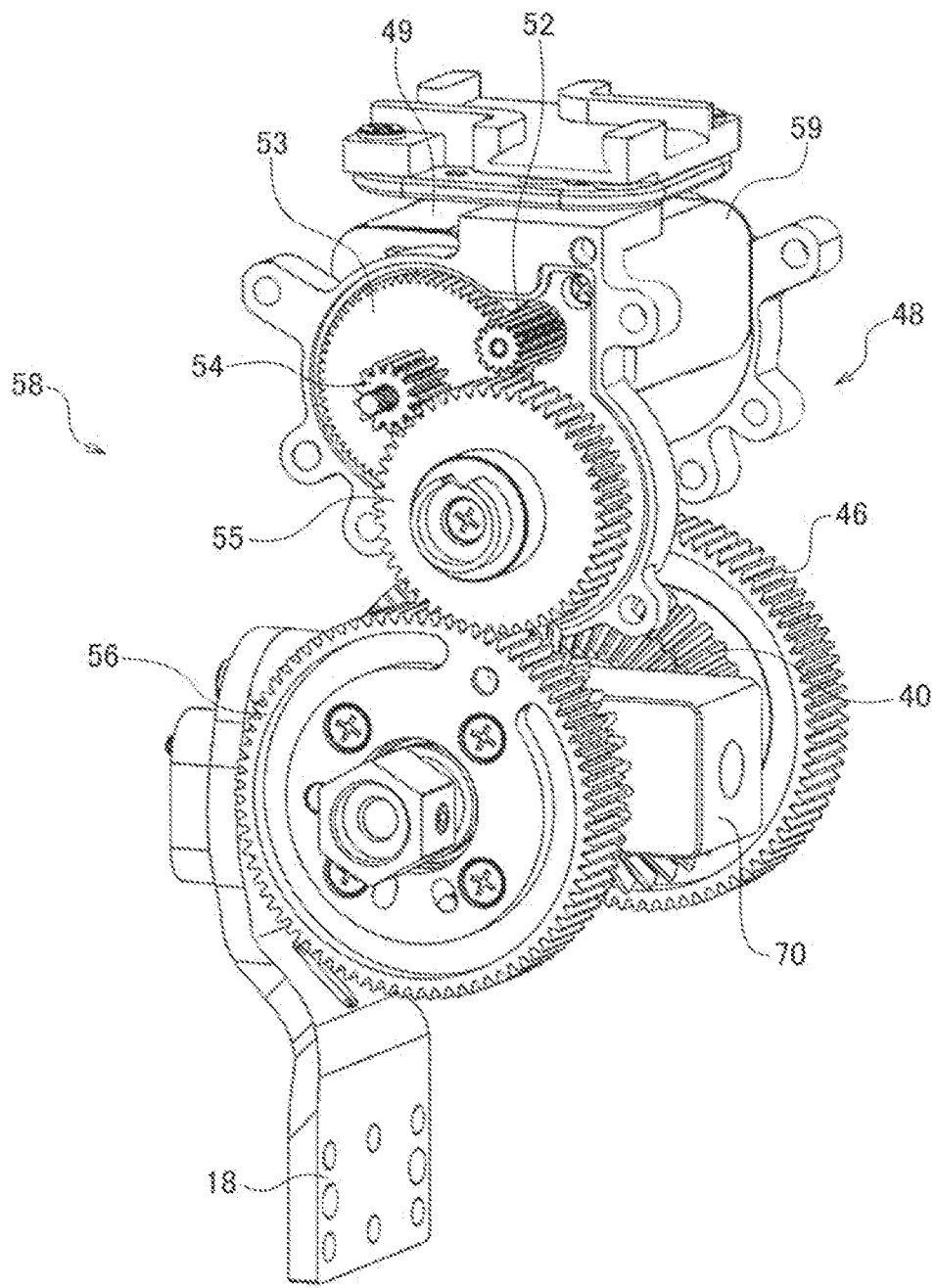
FIG. 5 is a right front perspective view of the two-axis rotation mechanism.
Figure 6:
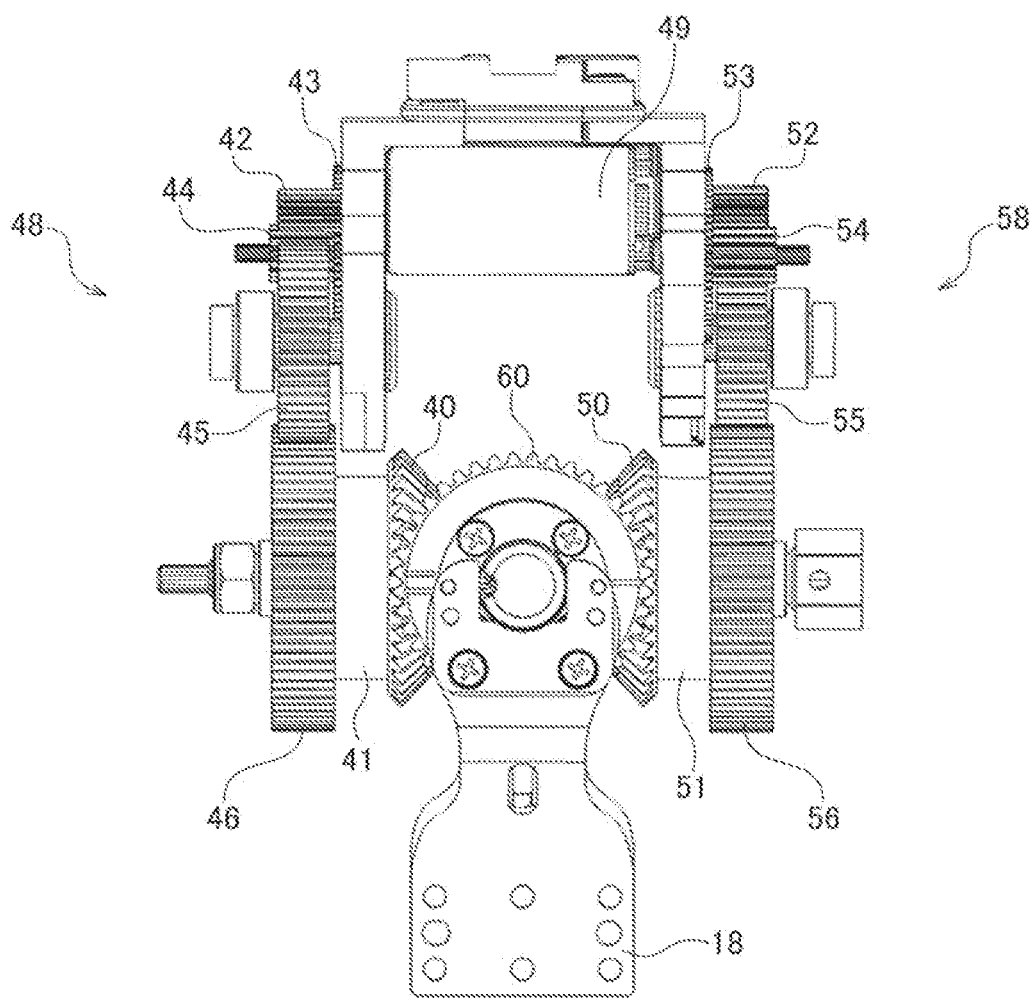
FIG. 6 is a rear elevational view of the two-axis rotation mechanism.

FIG. 3 depicts a left front perspective view of the two-axis rotation mechanism 30; FIG. 4 depicts a front elevational view of the two-axis rotation mechanism 30; FIG. 5 depicts a right front perspective view of the two-axis rotation mechanism 30; and FIG. 6 depicts a rear elevational view of the two-axis rotation mechanism 30. The two-axis rotation mechanism 30 includes a first bevel gear 40, a second bevel gear 50 disposed at a position where the second bevel gear 50 coaxially faces the first bevel gear 40 in an axial direction, a third bevel gear 60 that meshes with the first bevel gear 40 and the second bevel gear 50, a first motor 49 for supplying rotational force to the first bevel gear 40, and a second motor 59 for supplying rotational force to the second bevel gear 50. The rotational axis of the first bevel gear 40 and the second bevel gear 50 and the rotational axis of the third bevel gear 60 intersect with each other at one point. The point at which the axes intersect with each other is referred to as a "point of intersection." It is to be noted that, although wiring 80 for electric parts such as the motors is depicted in FIG. 3 (in the other figures, the wiring 80 is not depicted), the wiring 80 is disposed such that it passes the point of intersection as described later.

The first bevel gear 40 is fixed to a first transmission gear 46 through a first connection portion 41 such that the first transmission gear 46 rotates integrally with the first bevel gear 40. The first transmission gear 46 is connected to the output power shaft of the first motor 49 through a first speed reduction mechanism 48. In the first speed reduction mechanism 48, a first gear 42 is fixed to the output power shaft of the first motor 49 and meshes with a first gear 43, and a first gear 44 is formed coaxially and integrally with the first gear 43 having a different number of teeth and meshes with a first gear 45 while the first gear 45 meshes with the first transmission gear 46. Rotational force of the first motor 49 is transmitted to the first transmission gear 46 through the first speed reduction mechanism 48 such that the rotational force is supplied to the first bevel gear 40.

The second bevel gear 50 is fixed to a second transmission gear 56 through a second connection portion 51 such that the second transmission gear 56 rotates integrally with the second bevel gear 50. The second transmission gear 56 is connected to the output power shaft of the second motor 59 through a second speed reduction mechanism 58. In the second speed reduction mechanism 58, a second gear 52 is fixed to the output power shaft of the second motor 59 and meshes with a second gear 53, and a second gear 54 is formed coaxially and integrally with the second gear 53 having a different number of teeth and meshes with a second gear 55 while the second gear 55 meshes with the second transmission gear 56. Rotational force of the second motor 59 is transmitted to the second transmission gear 56 through the second speed reduction mechanism 58 such that the rotational force is supplied to the second bevel gear 50.

In the two-axis rotation mechanism 30, in order to fix the positional relation between the first bevel gear 40, the second bevel gear 50, and the third bevel gear 60, a shaft member 70 for supporting the first bevel gear 40, the second bevel gear 50, and the third bevel gear 60 for rotation thereon is provided.

Figure 7:
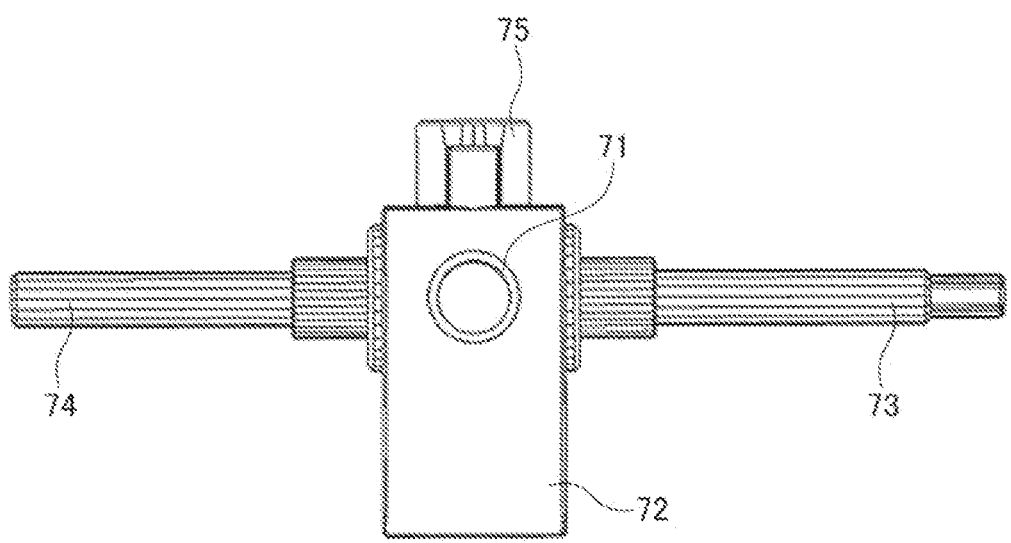
FIG. 7 is a top plan view of a shaft member.

FIG. 7 depicts a top plan view of the shaft member 70. The shaft member 70 has a base portion 72, a first shaft portion 73 projecting from the base portion 72 and being inserted in an annular hole portion of the first bevel gear 40, a second shaft portion 74 projecting from the base portion 72 and being inserted in an annular hole portion of the second bevel gear 50, and a third shaft portion 75 projecting from the base portion 72 and being inserted in an annular hole portion of the third bevel gear 60. The bevel gears are supported for rotation on the individual shaft portions through respective bearings.

A through-hole 71 is provided in the base portion 72, and a point of intersection between a rotational axis of the first shaft portion 73 and the second shaft portion 74 (rotational axis of the first bevel gear 40 and the second bevel gear 50) and a rotational axis of the third shaft portion 75 (rotational axis of the third bevel gear 60) is included in the through-hole 71. In this example, the through-hole 71 is formed in a direction perpendicular to both the rotational axis of the first shaft portion 73 and the second shaft portion 74 and the rotational axis of the third shaft portion 75. It is to be noted that it is sufficient if the through-hole 71 is formed such that it includes the point of intersection of the two rotational axes therein; it may not be perpendicular to both of the two rotational axes. As described later, the through-hole 71 is provided as a passage for the wiring 80 (refer to FIG. 3) for electric parts such as the motors.

Figure 8:
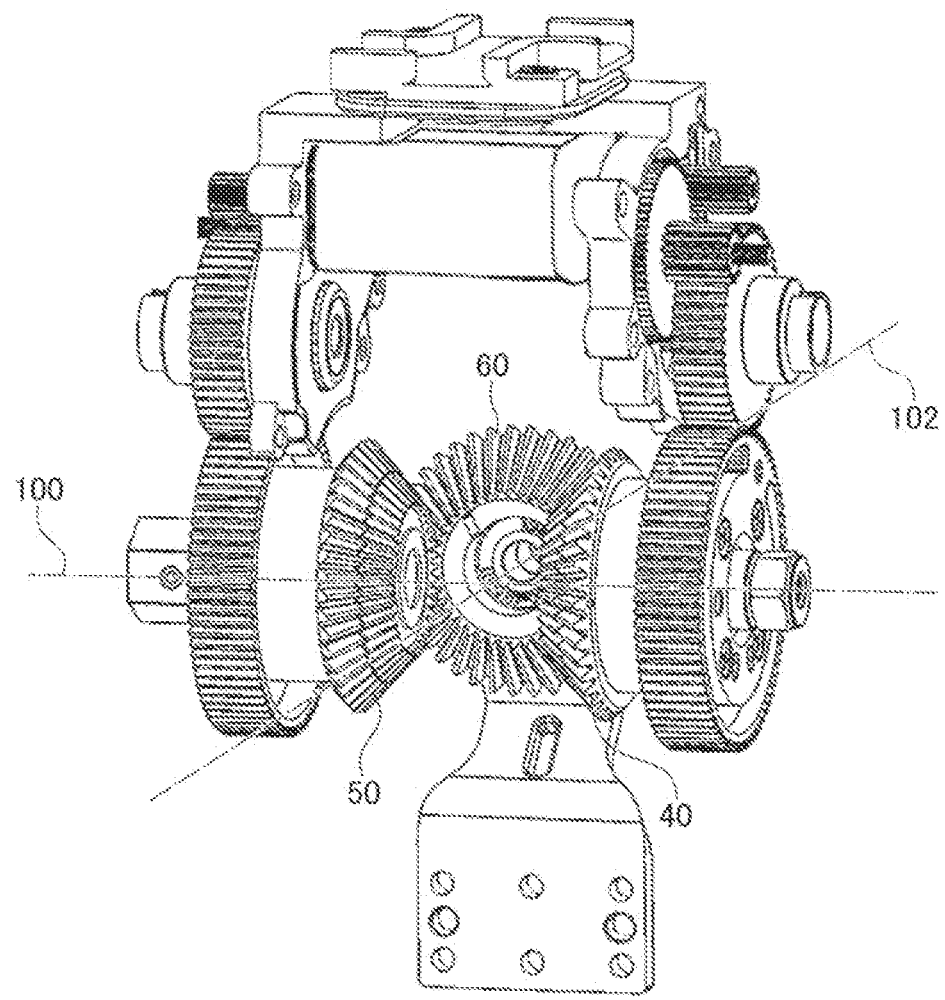
FIG. 8 is a view depicting two rotational axes that intersect with each other.

FIG. 8 depicts the two rotational axes intersecting with each other. Referring to FIG. 8, the shaft member 70 is omitted. The rotational axis of the first bevel gear 40 and the second bevel gear 50 is a pitch axis 100 of the rotation device 10, and the rotational axis of the third bevel gear 60 is a roll axis 102 of the rotation device 10. The pitch axis 100 and the roll axis 102 intersect with each other, and the point of intersection of them is in the inside of the through-hole 71 of the shaft member 70 not depicted in FIG. 8, as described above.

In the following, examples of operation of the two-axis rotation mechanism 30 are described.

Figure 9:
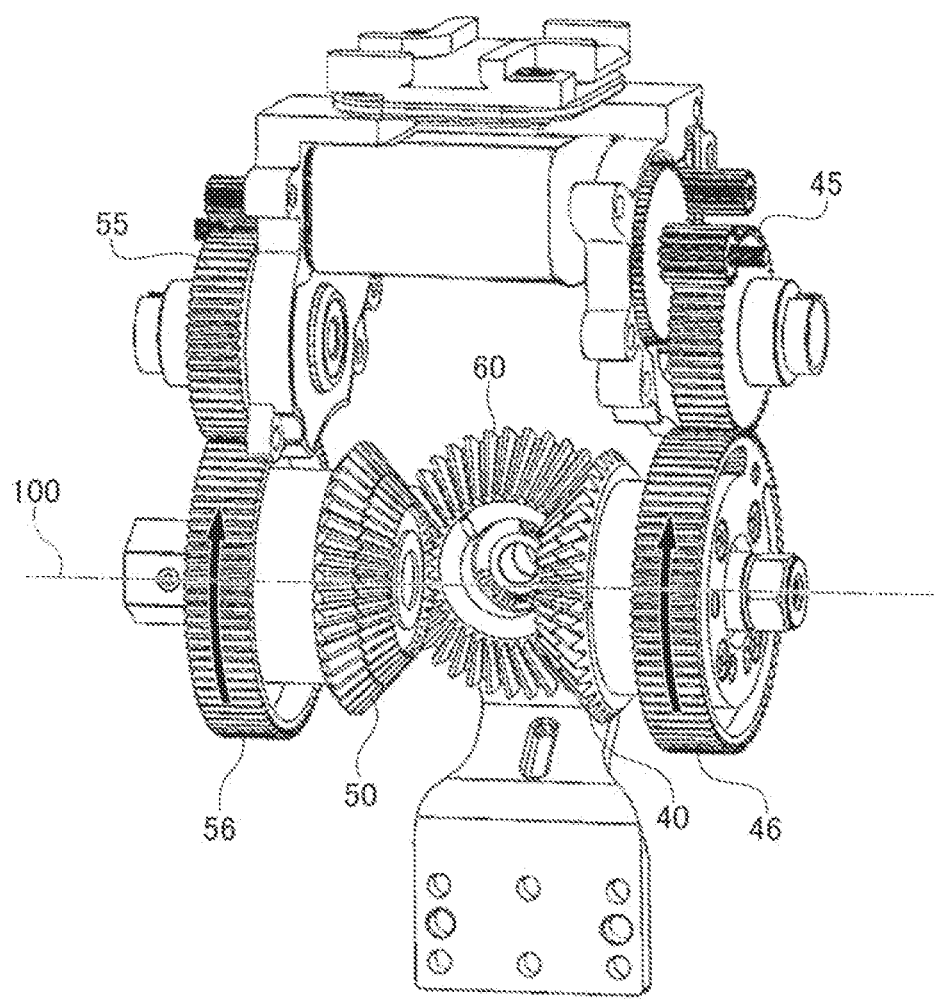
FIG. 9 is a view depicting a state in which rotational force of the same magnitude is supplied, in the same direction, to a first transmission gear and a second transmission gear.

FIG. 9 depicts a state in which rotational force of the same magnitude is supplied, in the same direction as viewed from the point of intersection, to the first transmission gear 46 and the second transmission gear 56. In this case, since the first bevel gear 40 and the second bevel gear 50 are locked to the third bevel gear 60, the first gear 45 and the second gear 55 rotate relative to the first transmission gear 46 and the second transmission gear 56, respectively. By this, rotational motion of the two-axis rotation mechanism 30 around the pitch axis 100 is implemented.

Figure 10:
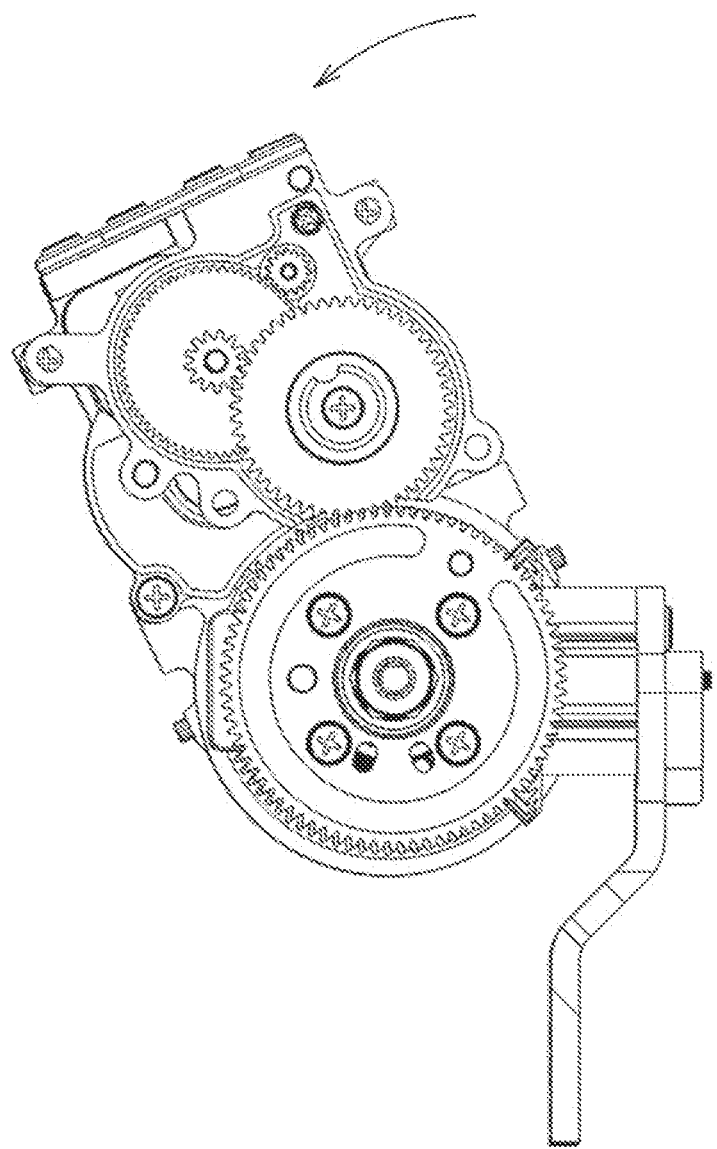
FIG. 10 is a view depicting a state in which the two-axis rotation mechanism rotates around a pitch axis.

FIG. 10 depicts a state in which the two-axis rotation mechanism 30 rotates around the pitch axis.

Figure 11:
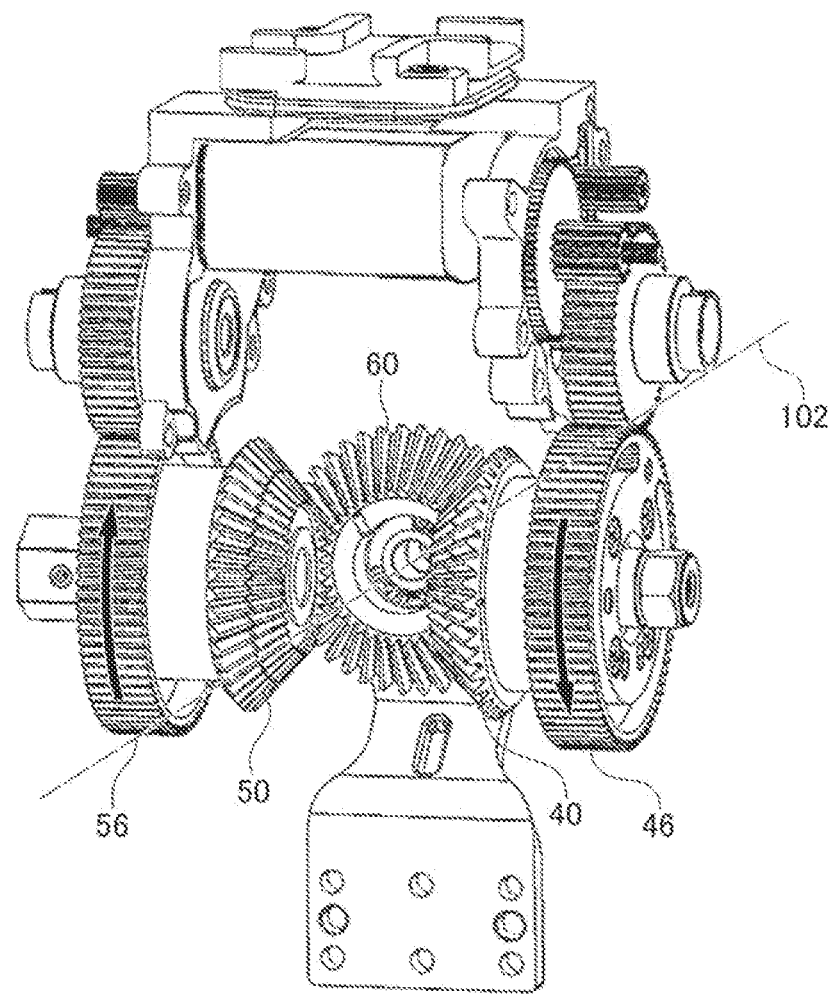
FIG. 11 is a view depicting a state in which rotational force of the same magnitude is supplied, in directions opposite to each other, to the first transmission gear and the second transmission gear.

FIG. 11 depicts a state in which rotational force of the same magnitude is supplied, in directions opposite to each other as viewed from the point of intersection, to the first transmission gear 46 and the second transmission gear 56. In this case, the first bevel gear 40 and the second bevel gear 50 rotate relative to the third bevel gear 60. Consequently, rotational motion of the two-axis rotation mechanism 30 around the roll axis 102 is implemented.

Figure 12:
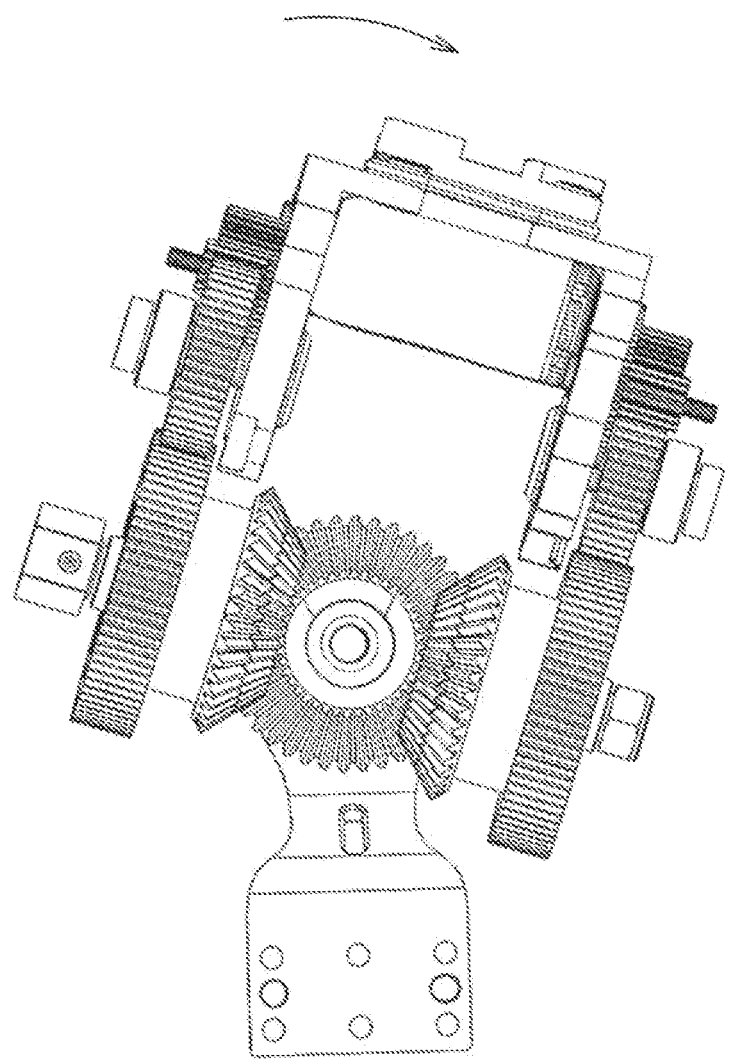
FIG. 12 is a view depicting a state in which the two-axis rotation mechanism rotates around a roll axis.

FIG. 12 depicts a state in which the two-axis rotation mechanism 30 rotates around the roll axis.

Since the two-axis rotation mechanism 30 implements the two kinds of rotational motion as described above, it can be configured compact in size in comparison with that in an alternative case in which the two kinds of rotational motion are implemented by separate mechanisms. In the two-axis rotation mechanism 30 of the embodiment, making the size further compact is implemented by disposing the two motors, i.e., the first motor 49 and the second motor 59, in a lined up relation with each other.

Figure 13:
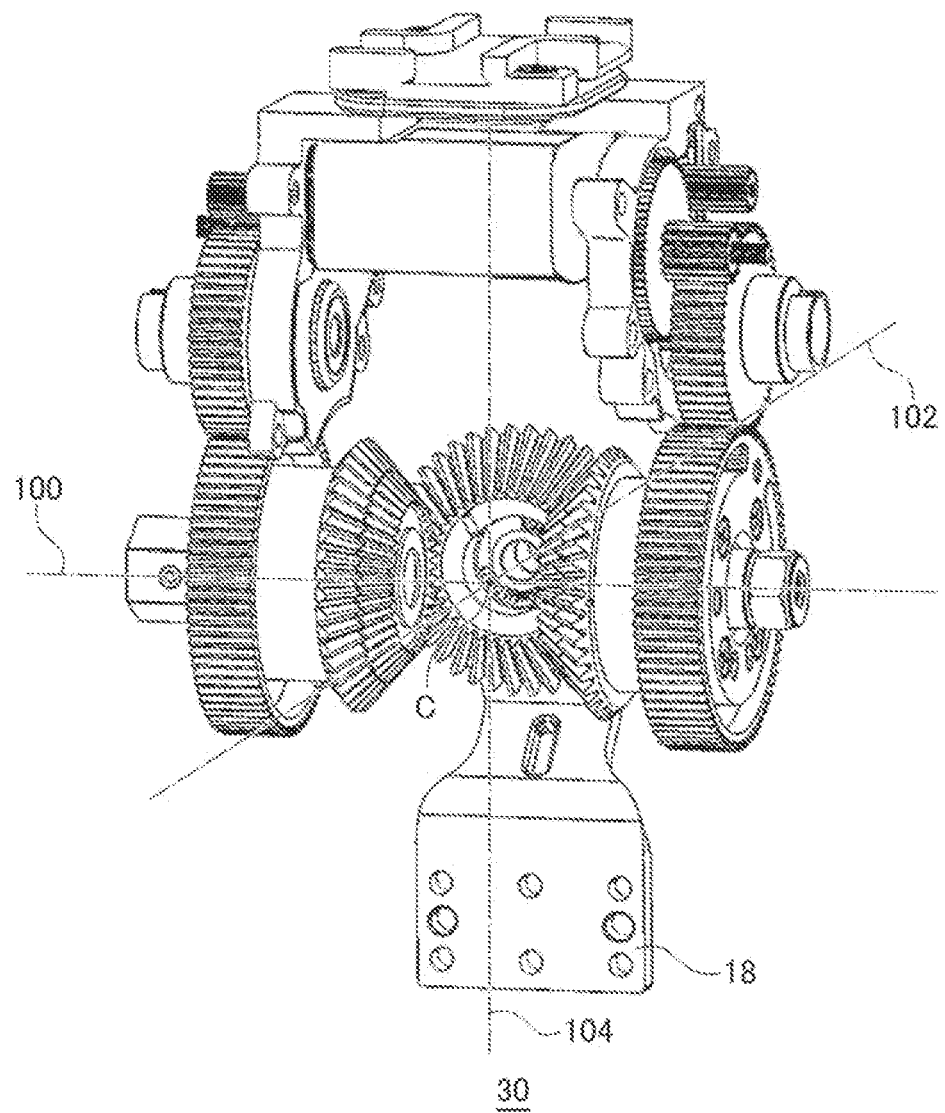
FIG. 13 is a view depicting three rotational axes of the rotation device.

FIG. 13 depicts three rotational axes of the rotation device 10. In the rotation device 10, the attachment member 18 attaches the two-axis rotation mechanism 30 to the one-axis rotation mechanism 12 such that the rotational axis (yaw axis 104) of the drive shaft 13 of the one-axis rotation mechanism 12 passes a point C of intersection of the pitch axis 100 and the roll axis 102. By determining the positional relation between the one-axis rotation mechanism 12 and the two-axis rotation mechanism 30 in such a manner, compact three-axis rotational motion around the center point can be implemented.

It is to be noted that the attachment member 18 is configured in an S shape as depicted in FIG. 2 and is connected on the upper end side thereof to the two-axis rotation mechanism 30 and on the lower end side thereof to the one-axis rotation mechanism 12. When the attachment member 18 is compared with that in an alternative case in which it is configured in a linear shape as indicated by a broken line in FIG. 2, configuring the attachment member 18 in an S shape allows the distance between the position of fixation of the attachment member 18 to the connection portion 14 and the rotational axis of the drive shaft 13 to be made shorter, providing an advantageous effect of reducing the moment.

As described hereinabove, in the two-axis rotation mechanism 30, the first motor 49 and the second motor 59 that are electric parts are disposed. In the robot apparatus 1, since the battery 3 is provided on the lower face of the base 2, it may be necessary to lay the wiring 80 (refer to FIG. 3) for the electric parts to extend to the base 2.

Referring to FIG. 13, since the pitch axis 100 and the roll axis 102 intersect with each other at the point C of intersection, the relative positional relation between the components of the two-axis rotation mechanism 30 as viewed from the point C of intersection is fixed. Thus, the distances from the point C of intersection to each electric part mounted on the two-axis rotation mechanism 30 is typically fixed and does not vary by the posture. Accordingly, in the two-axis rotation mechanism 30, the wiring 80 for the electric parts is laid to pass the point C of intersection of the pitch axis 100 and the roll axis 102. This can reduce the necessity to perform excess length processing for the wiring 80 and so forth.

As described hereinabove, the through-hole 71 is formed in the shaft member 70 so as to include the point C of intersection therein, and accordingly, the wiring 80 for the electric parts is laid to pass through the through-hole 71. The through-hole 71 is formed cylindrically, and in order to prevent wiring damage, for example, an annular bush made of rubber may be fitted in the through-hole 71. Although the wiring 80 for the electric parts includes wiring for the first motor 49 and wiring for the second motor 59, it may include wiring other than the above. It is to be noted that, in the embodiment, the first motor 49 and the second motor 59 are disposed in a region in a direction in which none of the first bevel gear 40, the second bevel gear 50, and the third bevel gear 60 is provided as viewed from the point C of intersection. Although, in the embodiment, the first motor 49 and the second motor 59 are disposed at an upper portion of the two-axis rotation mechanism 30, disposing the electric parts in such a region as described above allows the wiring length to the point C of intersection to be reduced.

The present disclosure has been described in connection with the embodiment. The embodiment described above is exemplary, and it is recognized by those skilled in the art that various modifications are possible for combination of the components and the processes of the embodiment and that also such modifications fall within the scope and spirit of the present disclosure.

What is claimed is:
1. A rotation device comprising:
 a two-axis rotation mechanism including:
  a first bevel gear having a grooved surface for gear meshing,
  a second bevel gear having a grooved surface for gear meshing, the second bevel gear being disposed at a position where the second bevel gear grooved surface coaxially faces the first bevel gear grooved surface in an axial direction,
  a third bevel gear having a grooved surface for gear meshing, which third bevel gear grooved surface meshes with the first bevel gear grooved surface and the second bevel gear grooved surface,
  a first motor for supplying rotational force to the first bevel gear,
  a second motor for supplying rotational force to the second bevel gear, and
  a shaft member that supports the first bevel gear, the second bevel gear, and the third bevel gear for rotation thereon such that a first rotational axis of the first bevel gear and the second bevel gear and a second rotational axis of the third bevel gear intersect with each other at a point of intersection;
 a one-axis rotation mechanism including a drive shaft and a third motor for supplying rotation force to the drive shaft; and
 an attachment member that attaches the two-axis rotation mechanism to the one-axis rotation mechanism such that a rotational axis of the drive shaft passes the point of intersection; wherein the shaft member forms an opening passing through the point of intersection that allows wiring therethrough, an attachment point of the attachment member to the two-axis rotation mechanism is in a first plane perpendicular to the rotational axis of the third bevel gear and an attachment point of the attachment member to the one-axis rotation mechanism is in a second plane perpendicular to the rotational axis of the third bevel gear, and the first plane and second plane are parallel to one another and offset from one another to reduce a moment about the rotational axis of the drive shaft.

2. The rotation device according to claim 1, wherein the shaft member has a base portion, a first shaft portion projecting from the base portion and being inserted in an annular hole portion of the first bevel gear, a second shaft portion projecting from the base portion and being inserted in an annular hole portion of the second bevel gear, and a third shaft portion projecting from the base portion and being inserted in an annular hole portion of the third bevel gear.

3. The rotation device according to claim 1, wherein the two-axis rotation mechanism further includes
a first transmission gear that rotates integrally with the first bevel gear,
a first speed reduction mechanism that transmits rotational force of the first motor to the first transmission gear,
a second transmission gear that rotates integrally with the second bevel gear, and
a second speed reduction mechanism that transmits rotational force of the second motor to the second transmission gear.

4. The rotation device according to claim 1, wherein the first motor and the second motor are disposed in a lined up relation with each other.

* * * * *